J. J. Greenough,
Pegging Machine,
No. 698, Reissued Apr. 26, 1859.
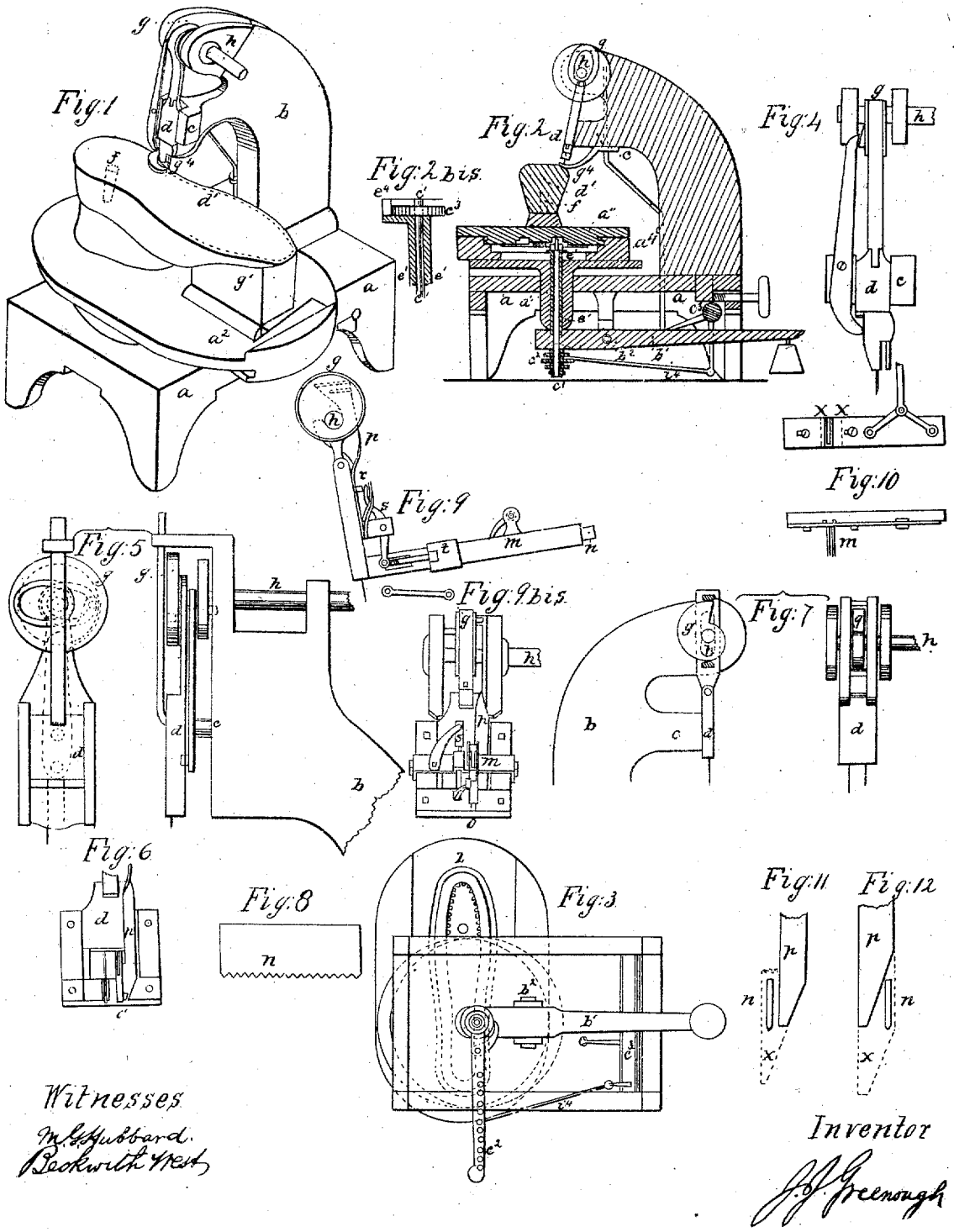
Witnesses
M. G. Hubbard.
Beckwith West
Inventor
J. J. Greenough

UNITED STATES PATENT OFFICE.

JOHN JAMES GREENOUGH, OF NEW YORK, N. Y.

IMPROVEMENT IN MACHINES FOR PEGGING BOOTS AND SHOES.

Specification forming part of Letters Patent No. 10,427, dated January 17, 1854; Reissue No. 269, dated July 4, 1854; Reissue No. 698, dated April 26, 1859.

*To all whom it may concern:*

Be it known that I, JOHN JAMES GREENOUGH, of the city, county, and State of New York, did receive Letters Patent of the United States, dated the 17th day of January, 1854, for several inventions in Shoe-Pegging Machinery, which I now desire to separate and to have reissued to me in several distinct patents; and I do hereby describe and ascertain one of said inventions contained in said Letters Patent, referring to the accompanying drawings, in which—

Figure 1 is a perspective view of the machine; Fig. 2, vertical section; Fig. 3, plan from below; Fig. 4, awl and peg-stock detached; Fig. 5, modication; Fig. 6, front view of pegging-stock, &c.; Fig. 7, modified section; Fig. 8, peg-wood; Fig. 9, peg-feed; Figs. 10, 11, 12, peg-cutters.

Prior to my invention attempts were made to peg boots and shoes by machinery so organized that the awl and peg-driver were driven down to make the holes and to force in the pegs by hammers or levers and retracted by springs or equivalent reacting but not positive mechanisms, and these were found to be so defective and attended with so many practical difficulties in use that hand-pegging was preferred.

To obviate the difficulties before experienced, I employ a positive mechanical movement, such as an eccentric, a crank or cam, or other equivalent mechanism for operating the awl and peg-driver, giving to them by a direct connection the same positive upward as downward movement. I have demonstrated that by the use of such means, when run at a sufficient velocity, all the difficulties heretofore experienced are avoided, and I thus attain a rapidity and perfection of execution which render the application of machinery to this purpose practicable and economical.

It will be obvious that if the awl and peg-driver were raised by a spring, there would be no certainty of its proper action under all circumstances. I have therefore employed the same device for withdrawing them that I use in driving, and I thus determine exactly and positively the amount and range of motion each way at whatever velocity the machine may be driven, and by the most simple and effective means known in mechanics.

It is also obvious that many modifications of the cam, eccentric, or crank may be made, all of which are well known, and that other positive mechanically equivalent means may be substituted, and that by them the stocks of the awl and peg-driver may be moved with varying velocities, modified to suit the requirements of the work to be done, and any competent mechanician can substitute them without further particular description, those which I prefer being shown in the accompanying drawings as examples.

In the drawings, Fig. 1, *b* is the standard or frame that supports the driving apparatus. This may be of any convenient form suggested. *g* is the driving-eccentric connected directly with the awl and peg driving stocks or slides *d*, so as to cause them to move in a right line as desired. *d'* is a shoe in a position to be pegged. The peg-driver and awl for making the holes and inserting pegs may be on separate stocks and driven alternately; but I prefer to put them both into one sliding stock, which is made to slide up and down in the frame or standard of the machine.

In Fig. 1, *a a* is the base of the frame, from which rises the standard *b*, that at its upper end projects over sufficiently to hold the slide that pegs the shoe, and above the slide is the driving-shaft *h*, from which all the parts are moved. On this shaft there is an eccentric or crank or cam, *g*, (the latter is shown in the drawings,) of any style known that will give the desired motion, which may be regular, like a simple crank or eccentric, or irregular. This latter can be effected by the cam seen in Fig. 1 or by a grooved cam, and this irregular motion I prefer; but it is essential that the motions up and down should be positive and controlled in their range, forcing down the awl and peg to the precise point, and drawing them back to a proper point at each action.

The other parts used for the purpose are as follows: The apparatus for forming the pegs and feeding them into the driving apparatus consists of a trough, *m*, through which strips of wood are fed, made like the ordinary pegs used in shoe-manufacture, but only split off one way, so as to present a series of pegs in a row, as seen in Fig. 8, *n*, attached together in a strip, *n*. The strip of peg-wood is fed forward at intervals the breadth of a single peg at a time by a perpetual feed, or such as will feed an infinite series of pegs in succession. This may be effected by a variety of apparatus, such as feed-rollers, or a feed-roller and spring, or an endless screw working into the lower serrated edge of the peg-wood, or by the device shown in the drawings at Fig. 9, all of which are well-known endless feeds, and are but the equivalents of each other.

The device shown at Fig. 9 is a reciprocating feed, in which *m* is the trough through which the peg-wood *n* passes. On this trough, or beside it, there is a slide, *t*, that is made to slide by a vibrating lever, *s*, to the lower end of which it is attached by a connecting-rod. The lever *s* is vibrated by the upward and downward motions of the pegging-stock, heretofore described, so that when the peg driving stock rises the peg-wood is fed forward and cut off, ready to be driven as the peg-driver stock descends.

To cut off the peg properly, a cutter must pass through it in a line perpendicular to the top and bottom lines of the peg strip and at right angles to the sides thereof, the cut being made from side to side through the peg-strip without regard to the course of the grain of the wood. This cut may be made by forcing a knife having an inclined back downward, so as to cut across the peg-wood, as seen in Fig. 11, in which *n* is the cross-section of the peg-wood; *p*, the knife in position before the cut is made; *x*, dotted lines showing the cut made.

Fig. 12 shows a modification in which the edge of the cutter is inclined, which performs a somewhat similar action by being pushed downward into the position shown by dotted lines. Another mode is to force the edge of a knife that is parallel with the side of the peg-strip, straight forward across it in a plane of motion at right angles thereto, as seen in Fig. 10, the dotted lines *x* showing the range of motion. The combined action of these parts is, first, forcing forward the peg-wood into the recess, and, secondly, cutting off by the knife which is actuated by a cam, crank-pin or eccentric from the driving-shaft.

The awl and peg-driver stock is shown at Fig. 4 detached. At Fig. 5 a modification is seen. The peg-driver plays up and down in the recess *o*, Fig. 6, into which the peg-strip is fed when the peg-driver is raised, and the peg is then cut off, (or it may have been previously cut,) and as the peg-driver descends it forces the peg down through the sole of the shoe or boot into the hole previously made for it by the awl.

To move the shoe or boot when the awl is driven into the sole, the stock is moved sidewise by a cam or other equivalent device. The stock may either slide sidewise or turn on an arm of sufficient radius to change the angle of the awl but a little. Fig. 4 shows the first, Fig. 5 the second, method. The side movement of the stock, when the awl is in the shoe-sole, carries the shoe along the same distance, and brings the hole thus made in the sole into line with the peg when driven, the effect being the same whether the sole is carried along straight or is swiveled to peg around a curve, the motion of the shoe being entirely dependent upon the awl as a center.

To hold the shoe and properly present the sole to be pegged, I employ what I denominate a "universal-movement" carriage or holder. This is designed to give the shoe all the necessary movement to bring each portion of the edge of the curved and undulating sole up to a stationary point to receive a line of pegs all around. To effect this I employ a horizontal lever, $b'$, Fig. 2, on one end of which I support a standard, $a'$, on the top of which standard there is a horizontal plane, $a''$. This is counterbalanced by a weight at the opposite end of the lever $b'$, the fulcrum being at $b^2$. On the top of this plane two slides, one above the other, have a motion at right angles to each other, as clearly seen in Fig. 1; and on the top of the upper one the shoe is affixed. Now, it will be seen that if the lower plane has a revolving motion a movement in any direction can be effected, and if there is a gage at $g^4$ on the standard for the shoe to rest against, it will be kept in place while being moved by the awl guided by the operator in any direction.

It is obvious that if the plane $a''$ had a motion up and down, and the plate on which the shoe was clamped could slide freely on it without guides, the same effect might be produced.

Having thus fully described my invention or discovery for driving pegs into boots and shoes, what I claim therein as new, and for which I desire to secure Letters Patent, is—

Driving pegs into boots and shoes automatically by means of a peg-driver operated up and down by a positive mechanical movement, whether impelled by a cam, eccentric, or crank, or other equivalent, substantially as and for the purposes specified.

J. J. GREENOUGH.

Witnesses:
JAS. W. FRASER,
SYLVESTER LAY.